United States Patent
Madaiah

(10) Patent No.: US 9,762,677 B2
(45) Date of Patent: Sep. 12, 2017

(54) METHOD AND SYSTEM OF TRANSFERRING CONTENT TO COMPLETE A TASK FROM ONE USER EQUIPMENT TO THE OTHER IN A NETWORK

(71) Applicant: TEJAS NETWORKS LIMITED, Bangalore, Karnataka (IN)

(72) Inventor: Vinod Kumar Madaiah, Karnataka (IN)

(73) Assignee: Tejas Networks Limited, Bangalore (IN)

(*) Notice: Subject to any disclaimer, the term of this patent is extended or adjusted under 35 U.S.C. 154(b) by 382 days.

(21) Appl. No.: 13/746,496

(22) Filed: Jan. 22, 2013

(65) Prior Publication Data

US 2013/0212224 A1    Aug. 15, 2013

(30) Foreign Application Priority Data

Jan. 22, 2012 (IN) .............................. 257/CHE/2012

(51) Int. Cl.
    G06F 15/16     (2006.01)
    H04L 29/08     (2006.01)
(52) U.S. Cl.
    CPC ........ H04L 67/148 (2013.01); H04L 67/2814 (2013.01)
(58) Field of Classification Search
    CPC .... G06F 17/30; H04L 67/148; H04L 67/2814
    USPC .......................................... 709/203, 217, 219
    See application file for complete search history.

(56) References Cited

U.S. PATENT DOCUMENTS

| 8,432,906 B2* | 4/2013 | Wu .............................. 370/389 |
| 2006/0200865 A1* | 9/2006 | Leake et al. .................... 726/27 |
| 2006/0265427 A1* | 11/2006 | Cohen et al. ................. 707/200 |
| 2007/0192806 A1* | 8/2007 | Park et al. ...................... 725/80 |
| 2010/0169718 A1* | 7/2010 | Tausanovitch et al. ........ 714/49 |
| 2011/0013775 A1* | 1/2011 | Hu ........................ H04L 9/0827 380/278 |
| 2012/0297007 A1* | 11/2012 | Burckart ........... G06F 17/30873 709/208 |

* cited by examiner

*Primary Examiner* — Glenford Madamba
(74) *Attorney, Agent, or Firm* — Merchant & Gould P.C.

(57) ABSTRACT

The present invention relates to a method and system of preserving an active session with a site at a first user equipment and downloading or uploading contents or data on at least one second user equipment in a communication network. In one embodiment, this can be accomplished by registering the first user equipment, at least one second user equipment and a server with at least one lookup server, the first user equipment, the second user equipment and the lookup server are tagged with a unique identifier, browsing to select the content in the site at the first user equipment via a first communication link and redirecting automatically the selected temporarily content from the first UE to the identified second available UE for downloading or uploading, wherein the redirection is based on the unique ID of the content.

9 Claims, 3 Drawing Sheets

METHOD AND SYSTEM OF TRANSFERRING CONTENT TO COMPLETE A TASK FROM ONE USER EQUIPMENT TO THE OTHER IN A NETWORK

FIELD OF THE INVENTION

This application claims benefit of Serial No. 257/CHE/2012, filed 22 Jan. 2012 in India and which application is incorporated herein by reference. To the extent appropriate, a claim of priority is made to the above disclosed application.

The present disclosure relates generally to communication and more specifically to a method and system for managing communication sessions between two or more equipments.

BACKGROUND OF THE INVENTION

Traditionally browsing task and downloading/uploading task of a session is limited to a particular client that is utilized to access the content. When viewing or browsing a web page, for instance, a session is initiated between a browser of a personal computer and a head end. Downloading a video, audio, data file on the webpage is coupled to the same session and consequently will be downloaded to the same personal computer. The session is not aware of capabilities or service plan of the user equipment, e.g. internet connection plan of this PC. If another device or client of the user is better suited for downloads or uploads, the session is not aware of such device and hence cannot re-direct the contents to or from that other device. This lack of awareness may result in additional costs, such as to purchase conditional access rights to access the content utilizing the new client, in network bandwidth costs of networks utilized to transfer the content, and so on.

Example: As shown in FIG. 1, user has two devices UE1 and UE2. On UE1 the user likes a (video, audio, etc.) content while browsing (UE1=mobile). User cannot download it due to browsing policy or internet plan or data rate or signal quality or low battery. If this user has another device, say UE2, that is better positioned to download then, from his mobile device user would like to re-direct the download onto that another device (e.g. laptop, desktop, etc. connected to network where the content is available.) It is possible or well known in the prior arts that, the redirection of same data from one User Equipment to the other is possible. But none of the prior arts allow re-directed download or upload on the second user equipment while only browsing on the first user equipment.

Accordingly, there is a continuing need for redirection download or upload of the content or data.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one aspect of the present invention is a method of preserving an active session with a site at a first user equipment and downloading or uploading contents or data on at least one second user equipment in a communication network, the method comprising: registering the first user equipment, at least one second user equipment and a server with at least one lookup server, the first user equipment, the second user equipment and the server are tagged with a unique identifier, browsing to select the content in the site at the first user equipment via a first communication link and redirecting automatically the selected content temporarily from the first UE to the identified second available UE for downloading or uploading, wherein the redirection is based on the unique ID of the content.

In another aspect of the present invention is a system of preserving an active session with a site at a first user equipment and downloading or uploading contents or data on at least one second user equipment in a communication network, the system comprising: at least one server having content, and at least one look up server operatively configured to the plurality of user equipments and the server over the communication network, wherein the lookup server is configured for, registering the first user equipment, at least one second user equipment and a server with at least one lookup server, the first user equipment, the second user equipment and the server are tagged with a unique identifier, browsing to select the content in the site at the first user equipment via a first communication link and redirecting automatically the selected content temporarily from the first UE to the identified second available UE for downloading or uploading, wherein the redirection is based on the unique ID of the content.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the detailed description of the invention below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

Figure 1:
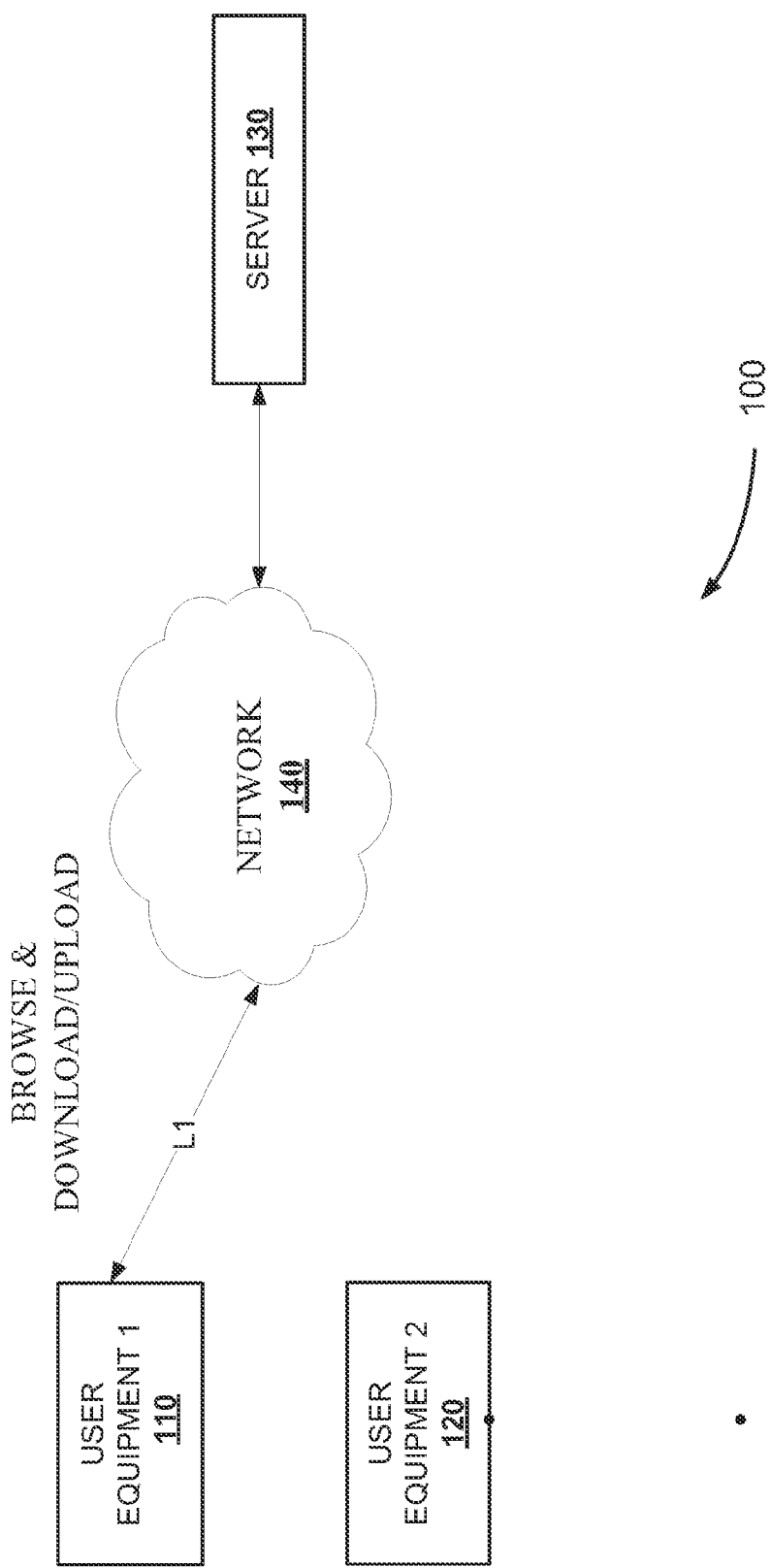
FIG. 1 illustrates an exemplary prior system in which data may be exchanged between two or more nodes in a network.

Persons skilled in the art will appreciate that elements in the figures are illustrated for simplicity and clarity and may have not been drawn to scale. For example, the dimensions of some of the elements in the figure may be exaggerated relative to other elements to help to improve understanding of various exemplary embodiments of the present disclosure.

Throughout the drawings, it should be noted that like reference numbers are used to depict the same or similar elements, features, and structures.

DETAIL DESCRIPTION OF THE INVENTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "computer", "processor" or "controller" may be provided through the use of dedicated hardware as well as hardware capable of executing software in the form of coded instructions stored on computer readable medium. A computer is generally understood to comprise one or more processors, and the terms computer and processor may be employed interchangeably herein. When provided by a computer or processor, the functions may be provided by a single dedicated computer or processor, by a single shared computer or processor, or by a plurality of individual computers or processors, some of which may be shared or distributed. Such functions are to be understood as being computer-implemented and thus machine-implemented. Moreover, use of the term "processor" or "controller" shall also be construed to refer to other hardware capable of performing such functions and/or executing software, and may include, without limitation, digital signal processor (DSP) hardware, reduced instruction set processor, hardware (e.g., digital or analog) circuitry, and (where appropriate) state machines capable of performing such functions.

FIG. 1 illustrates prior system in which data may be streamed or exchanged between two or more nodes in a network. The system 100 includes one or more user equipments (110, 120), a server 130, where the user equipments 110, 120 communicates with the server via a network 140 over link L1. The user equipments 110, 120 may include a portable terminal, a mobile terminal, a personal digital assistant (PDA), an MP3 player, a PSP, and the like, which are capable of storing or reproducing multimedia. Referring to FIG. 1, the server may be or may includes a network processor, a transmitter, a receiver, a meta interface (IF) processor, a user interface, a media redirection processor, an optimum UI determiner, an announcement processor, a device and service information provider, a media player component, a mobile code provider and processor, a media source processor, an environment monitor, and a controller. The server 130 is responsible for receiving data for connecting with user equipments. The server 130 is also responsible for receiving data for the connection from the user equipments over the network 140. For example, upon a multimedia request from the user equipments, the server reproduces a multimedia stream or content selected according to a user's request. Also, the server is responsible for managing a database (DB) (not shown in figure) which converts the multimedia stream to data and stores the same.

Figure 2:
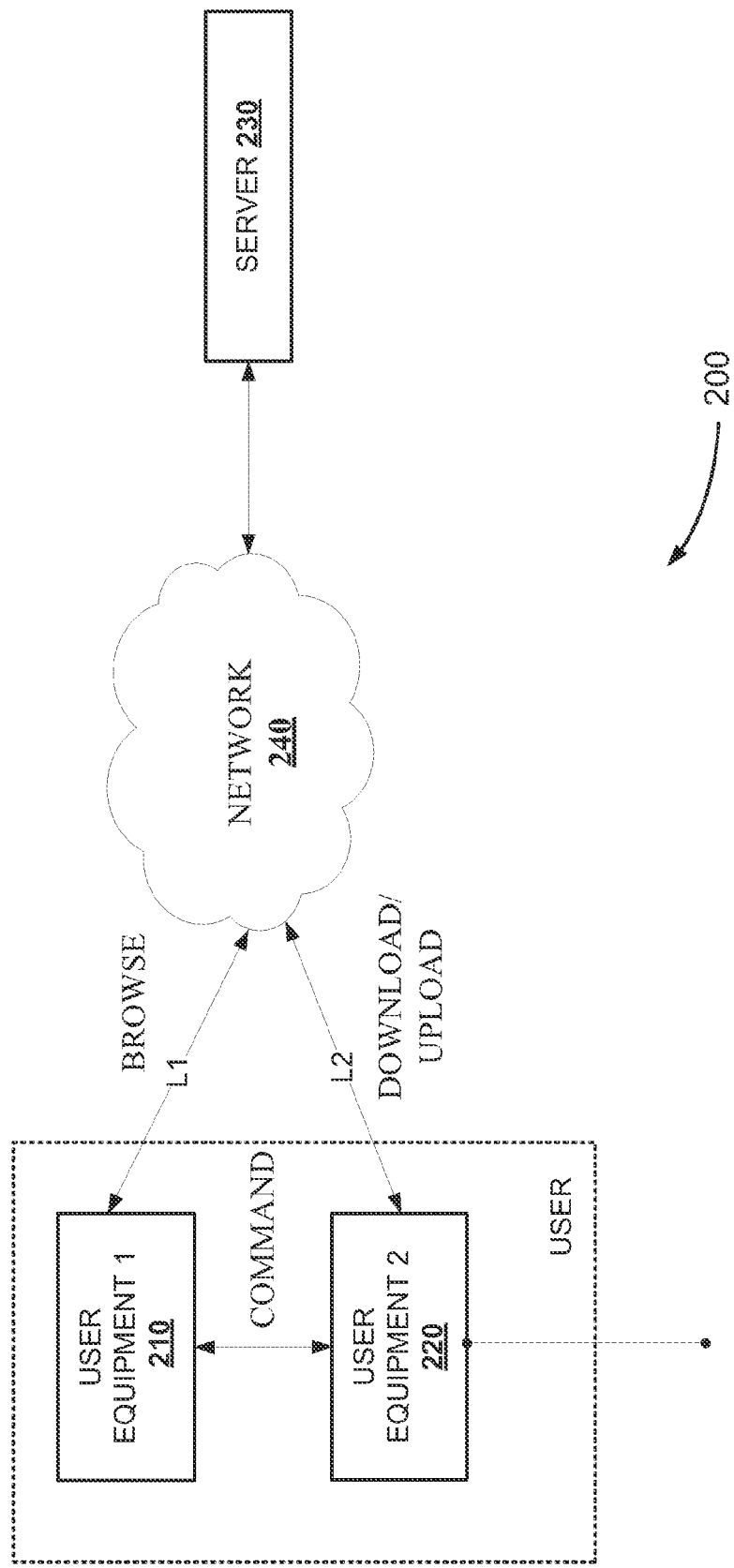
FIG. 2 illustrates an exemplary system of preserving an active session with a site at a first user equipment and downloading or uploading contents or data on at least one second user equipment in a communication network.

FIG. 2 illustrates an exemplary system of preserving an active session with a site at a first user equipment and downloading or uploading contents or data on at least one second user equipment in a communication network according to one embodiment of the present invention. The system 200 includes one or more user equipments (210, 220), a server 230, and the system may also include a lookup server (not shown in figure). The user equipments 210, 220 communicate with the network 240 over link L1 and link L2.

The user equipments 210, 220 may include a portable terminal, a mobile terminal, a personal digital assistant (PDA), an MP3 player, a PSP, and the like, which are capable of storing or reproducing multimedia.

The server 230 may be or may includes a network processor, a transmitter, a receiver, a meta interface (IF) processor, a user interface, a media redirection processor, an optimum UI determiner, an announcement processor, a device and service information provider, a media player component, a mobile code provider and processor, a media source processor, an environment monitor, and a controller. Also, the server is responsible for managing a database (DB) (not shown in figure) which converts the multimedia stream to data and stores the same.

The lookup server (not shown in figure) may be or may include any standard data processing means or computer, including a minicomputer, a microcomputer, a UNIX® machine, a mainframe machine, a personal computer (PC) such as INTEL® based processing computer or clone thereof, an APPLE® computer or clone thereof or, a SUN® workstation, or other appropriate computer. Lookup server generally includes conventional computer components (not shown), such as a motherboard, central processing unit (CPU), random access memory (RAM), hard disk drive, display adapter, other storage media such as diskette drive, CD-ROM, flash-ROM, tape drive, PCMCIA cards and/or other removable media, a monitor, keyboard, mouse and/or other user interface means, a modem, and/or other conventional input/output devices. Lookup server also includes a Network Interface for communication with other computers using an appropriate network protocol.

In an operation, End nodes (UEs) register their ID (Unique Registration ID or URI) with the server and may also register with the lookup server. UEs belonging to a user are grouped together under one User ID. Each UE's URI has physical address associated with it . . . example IP address, Tunnel ID, MAC address, Telephone number, etc. When a UE is connected to a network, the lookup server is notified about the physical address also. When user browse to select the content in the site or enters a particular servers ID to source a video content onto the UE1 210 via a first communication link, the UE's URI is notified to the lookup server (not shown in figure). UE1 210 requests the lookup server for physical address of the server 230 matching the server ID. The lookup server will return the physical address of the server 230 if available. If not, then the lookup server will request other lookup servers for the information (not shown in figure). Once UE1 210 receives physical address of the server 230, it will be able to download the video. A download of video is assigned a session ID by end nodes and which is stored by all intermediate network nodes (router, bridges, etc.). The network nodes, like RP (Rendezvous Point 260), also store associated URIs and optionally physical address. The Rendezvous Point (RP) can be within UE, Server, Router, bridges, proxy servers, serving gateway, packet data network gateway, IMS server, etc. If the existing session encounters fault, then network nodes will detect reason of failure and try to reestablish the same session with alternate end nodes by switching or re-directing stream to alternate URI of the user.

Further, once the content is selected by the user at the first user equipment, the first user may authenticate or the system automatically redirect the selected content temporarily from the first UE to the identified second available UE for downloading or uploading. The redirection of the first user equipment to the second user equipment is based on the unique ID of the content. It is also possible that the redirection of the selected content temporarily may be initiated by the server or may be at the Rendezvous Point via a second communication link. The server or Rendezvous Point (RP) are aware of the capabilities of User Equipments. The server, RP and lookup server are configured such that browsing session and downloading are decoupled.

Further, the notifying the amount of data downloaded or uploaded at the second User Equipment to the first User Equipment, once the task is completed.

In the present system, topology is not fixed and not restricted to end nodes connecting to fixed topology. The topology is routing topology over IP network or like and hence dynamic and not fixed. End nodes only know the ID and session ID. Topology knowledge of how to reach the end nodes or connect the end nodes is learnt by the end nodes and network nodes from the physical address and associated routing or bridging protocols. In this way session re-direction is network assisted. Buffering in the network is used while redirection or switching or sourcing.

Also, because of the presence of Rendezvous Point, the present invention is capable of doing multicasting and broadcasting. Also, the present system 200 can perform protection switching of unicast, multicast and broadcast traffic.

Figure 3:
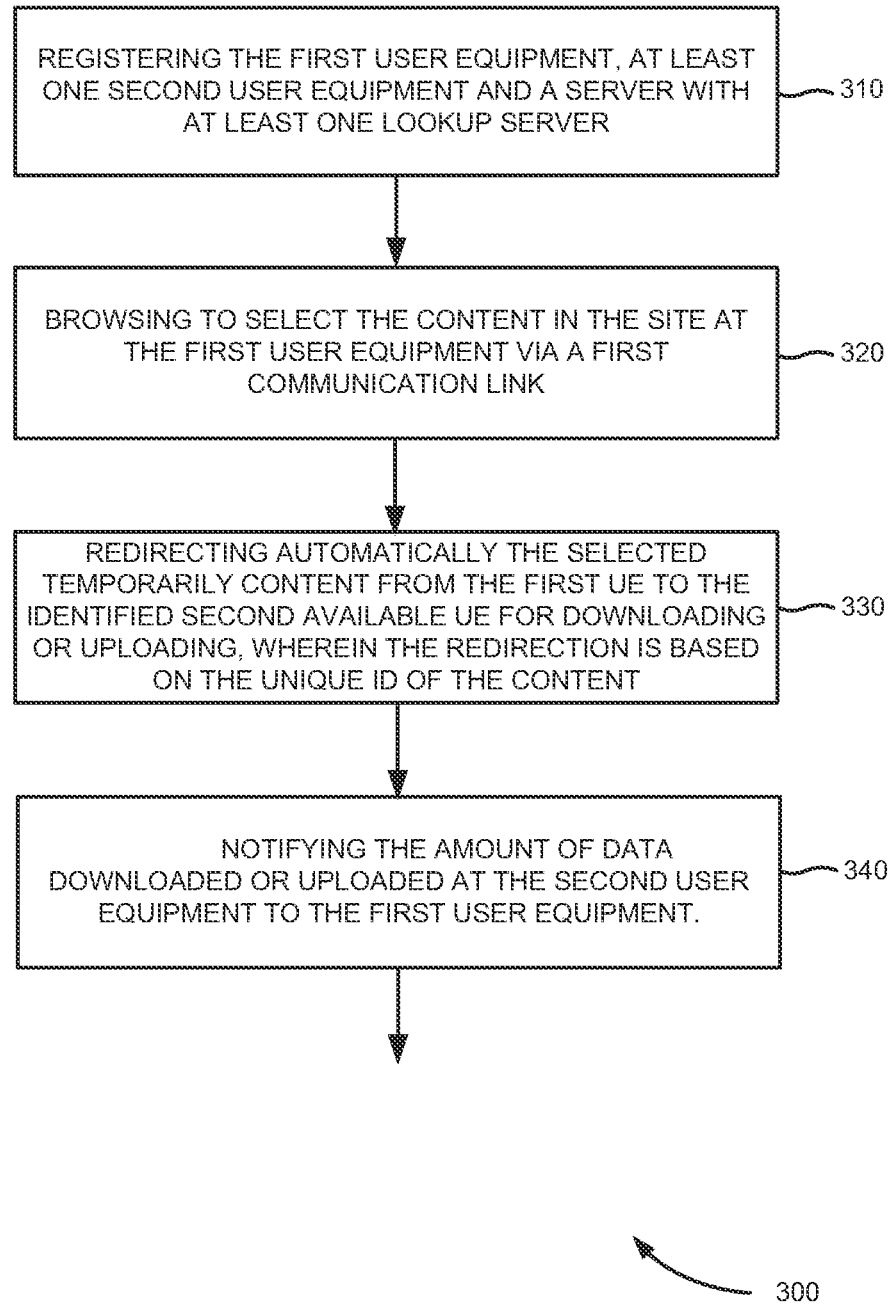
FIG. 3 illustrates an exemplary generalized operational flow including various operations that may be performed while preserving an active session with a site at a first user equipment and downloading or uploading contents or data on at least one second user equipment in a communication network.

FIG. 3 illustrates an exemplary generalized operational flow including various operations that may be performed while preserving an active session with a site at a first user equipment and downloading or uploading contents or data on at least one second user equipment in a communication network.

At step 310, the method allows to register the first user equipment, one or more second user equipment and a server with at least one lookup server, the first user equipment, the second user equipment and the lookup server are tagged with a unique identifier.

At step 320, the method allows the user to browse to select the content in the site at the first user equipment via a first communication link.

At step 330, the method automatically redirects the selected temporarily content from the first UE to the identified second available UE for downloading or uploading, wherein the redirection is based on the unique ID of the content. Further, the redirecting the selected temporarily content initiated by the server or at the Rendezvous Point via a second communication link, wherein the server or Rendezvous Point (RP) are aware of the capabilities of User Equipments.

Before redirecting the selected content at the first user equipment by the user, the method may ask for the authentication for the second User Equipment with the server at the first User Equipment.

The method also checks periodically integrity of the path between UE1 and server, and UE2 and server, where the checking integrity of the connection between the server and the user equipments by way of TCP acknowledgement, Continuity Check Message (CCM) of CFM IEEE 802.1ag, BFD (bidirectional fault detection), etc.

At step 340, the method notifies the first user equipment about the amount of data downloaded or uploaded at the second user equipment.

Although the method flowchart includes steps 310-340 that are arranged logically in the exemplary embodiments, other embodiments of the subject matter may execute two or more steps in parallel, using multiple processors or a single processor organized as two or more virtual machines or sub-processors. Moreover, still other embodiments may implement the steps as two or more specific interconnected hardware modules with related control and data signals communicated between and through the modules, or as portions of an application-specific integrated circuit. Thus, the exemplary process flow diagrams are applicable to software, firmware, and/or hardware implementations.

FIGS. 1-3 are merely representational and are not drawn to scale. Certain portions thereof may be exaggerated, while others may be minimized. FIGS. 1-3 illustrate various embodiments of the invention that can be understood and appropriately carried out by those of ordinary skill in the art.

I claim:

1. A method of preserving an active session with a site at a first user equipment and downloading or uploading content on at least one second user equipment in a communication network, the method comprising:

registering the first user equipment, at least one second user equipment and a server with at least one lookup server, wherein each of the first user equipment, the at least one second user equipment and the server are tagged with a unique registration identifier, wherein registering further comprises associating the first user equipment (UE1) and the at least one second user equipment (UE2) with a user identifier associated with a user, and wherein registering further comprises grouping user equipments (UEs) belonging to the user under a user identifier group;

initiating a browsing session to select the content in the server by the first user equipment via a first communication link;

receiving, from the server, a content identifier and a session identifier for the browsing session; and decoupling, in response to a request for downloading or uploading the content, the browsing session from the request for downloading or uploading wherein decoupling comprises:
  identifying the at least one second user equipment associated with the user identifier of the user from the user identifier group, and
  redirecting the selected content from the first user equipment to the identified at least one second user equipment for the downloading or uploading via a second network, wherein the redirection is based on the content identifier and the session identifier, and wherein redirecting the selected content further comprises:
    buffering the selected content at a network device during the redirecting, and
    notifying an amount of data downloaded or uploaded at the at least one second user equipment to the first user equipment at the completion of the downloading or uploading.

2. The method of claim 1, further comprising:
checking periodically integrity of a connection between the UE1 and the server, and the UE2 and the server, wherein checking periodically the integrity of the connection between the UE1 and the server and the UE2 and the server comprises checking the integrity by way of at least one of the following: TCP acknowledgement, Continuity Check Message (CCM) of CFM IEEE 802.1ag, and BFD (bidirectional fault detection).

3. The method of claim 1, further comprising:
redirecting the selected content initiated by the server or at a Rendezvous Point via the second communication link, wherein the server or the Rendezvous Point (RP) are aware of the capabilities of the UE1 and the UE2.

4. The method of claim 1, further comprising:
authenticating the identified at least one second user equipment with the server at the first user equipment before redirection of the selected content from the first user equipment to the identified at least one second user equipment.

5. A system of preserving an active session with a site at a first user equipment and downloading or uploading content on at least one second user equipment in a communication network, the system comprising:
  at least one server having content; and
  at least one lookup server operatively coupled to the plurality of user equipments and the at least one server over the communication network;
  wherein the lookup server is configured for:
    registering the first user equipment and the at least one second user equipment with a user identifier associated with a user, wherein each of the first user equipment and the at least one second user equipment are tagged with a unique registration identifier, wherein the at least one lookup server being configured for registering further comprises the at least one lookup server further configured for associating the first user equipment and the at least one second user equipment with the user identifier of the user, and wherein user equipments belonging to the user are grouped together under the user identifier;
    initiating a browsing session to select the content in the at least one server by the first user equipment;
    receiving, from the at least one server, a content identifier and a session identifier for the browsing session; and
    decoupling, in response to a request for downloading or uploading the content, the browsing session from the downloading or uploading, wherein decoupling comprises:
      identifying the at least second user equipment associated with the user identifier of the first user, and
      redirecting the selected content from the first user equipment to the identified at least one second user equipment for the downloading or uploading via a second network, wherein the redirection is based on the content identifier and the session identifier, and wherein redirecting the selected content further comprises: buffering the selected content at a network device during the redirecting, and notifying an amount of data downloaded or uploaded at the at least one second user equipment to the first user equipment at the completion of the downloading or uploading.

6. The system of claim 5, wherein integrity of a connection between the first user equipment and the server is periodically checked, wherein the integrity of the connection between the first user equipment and the server is periodically checked by way of at least one of the following: TCP acknowledgement, Continuity Check Message (CCM), and bidirectional fault detection.

7. The system of claim 5, wherein integrity of a connection between the at least one second user equipment and the server is periodically checked, wherein the integrity of the connection between the at least one second user equipment and the server is periodically checked by way of at least one of the following: TCP acknowledgement, Continuity Check Message (CCM), and bidirectional fault detection.

8. The system of claim 5, wherein a redirect of the downloading or uploading of the selected content is initiated by the server via the second communication link.

9. The system of claim 5, where the identified at least one second user equipment is authenticated with the server at the first user equipment before redirection of the selected content from the first user equipment to the at least one second user equipment.

* * * * *